July 21, 1953
O. R. KOLPE ET AL
2,646,092
LOG DEBARKING MACHINE HAVING WHIRLING
AND ROTATING BARK-REMOVING TOOLS
Filed Aug. 29, 1949
4 Sheets-Sheet 1
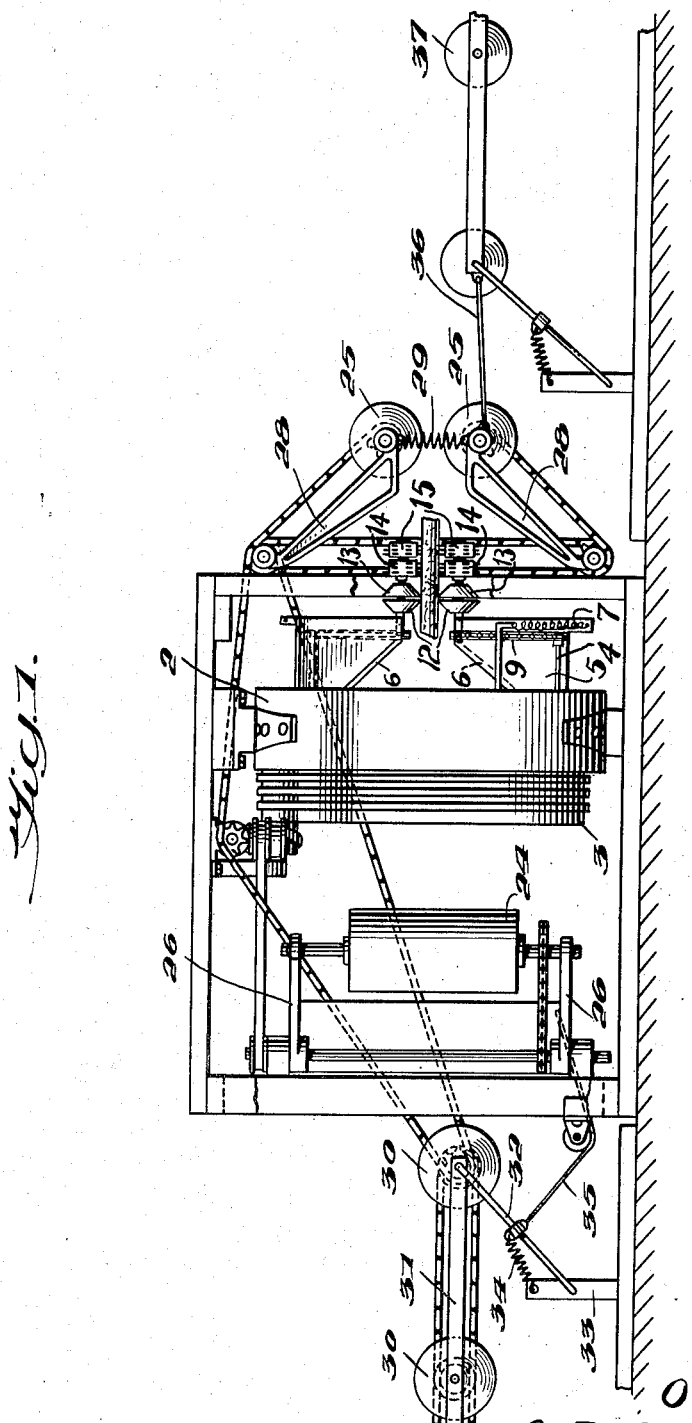
INVENTORS
O. R. Kolpe
O. B. Andersson
BY
ATTORNEYS

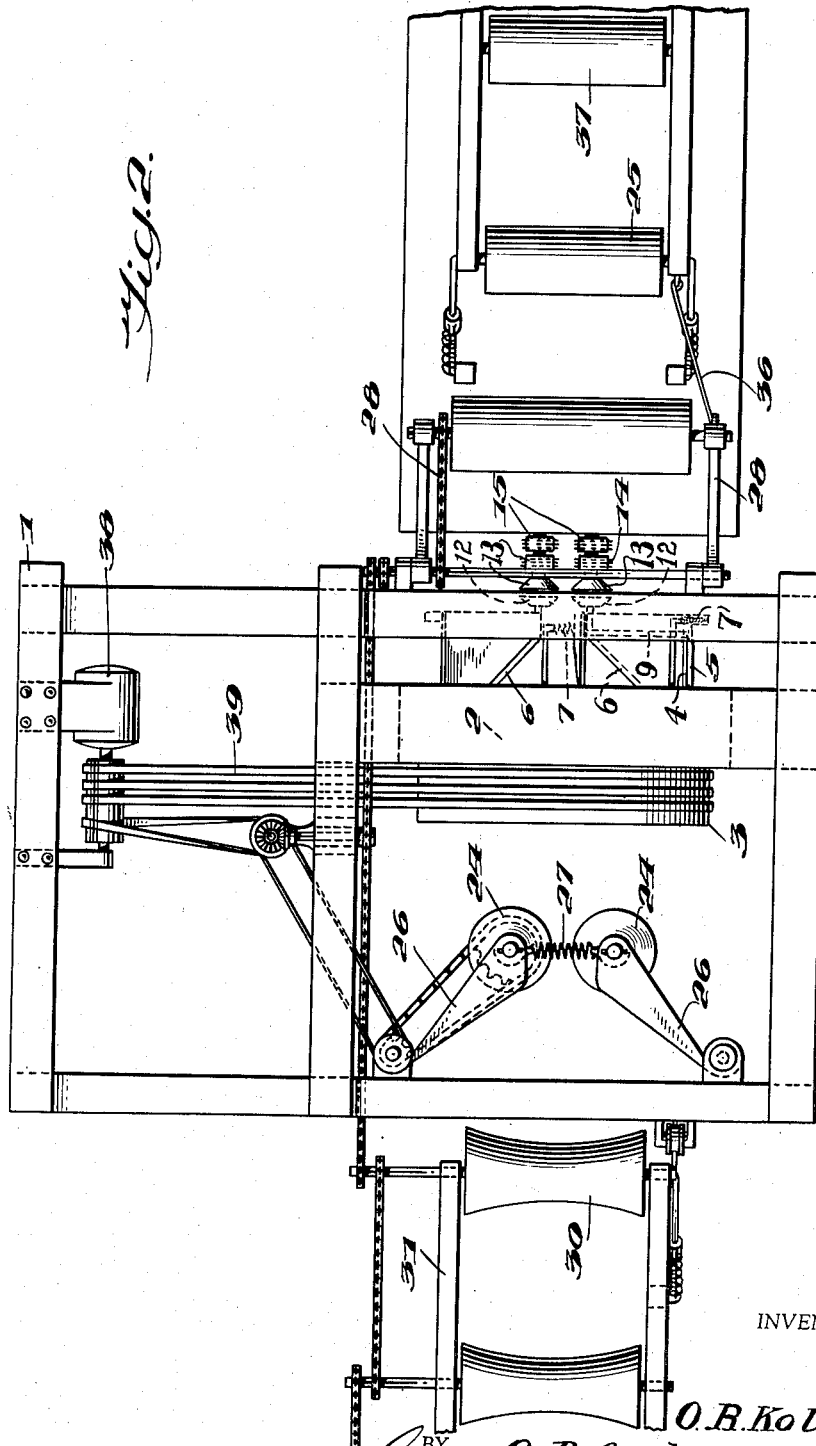

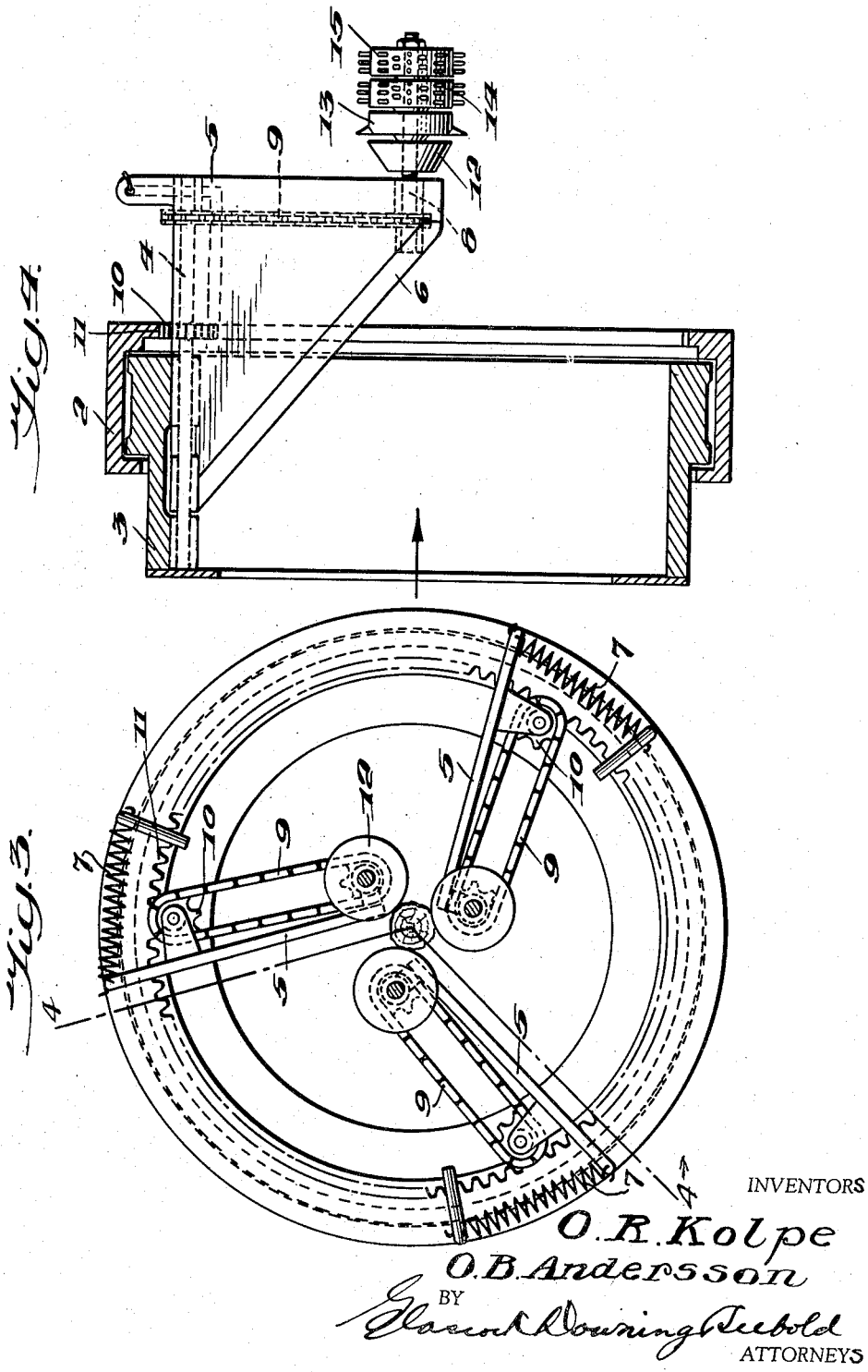

July 21, 1953  O. R. KOLPE ET AL  2,646,092
LOG DEBARKING MACHINE HAVING WHIRLING
AND ROTATING BARK-REMOVING TOOLS
Filed Aug. 29, 1949  4 Sheets-Sheet 4

Inventors
O. R. Kolpe
O. B. Andersson
By Glascock Downing Weibold
Attys.

Patented July 21, 1953

2,646,092

UNITED STATES PATENT OFFICE 2,646,092

LOG DEBARKING MACHINE HAVING WHIRLING AND ROTATING BARK-REMOVING TOOLS

Olof R. Kolpe, Kil, and Oscar B. Andersson, Forshaga, Sweden

Application August 29, 1949, Serial No. 112,868
In Sweden August 30, 1948

3 Claims. (Cl. 144—208)

1

The present invention relates to a machine for barking lumber and other round timber and comprises a rotatable drum, through which the logs pass and in which drum is provided a number of spring-actuated arms carrying the bark-removing tools, the drum being rotatably mounted in an annular bearing fixed in the frame of the barking machine, said bearing being provided with a gear rim in mesh with pinions on shafts rotatably mounted at the periphery of the drum. The machine is substantially characterized by the fact that the arms are swingably mounted on the shafts and are made right triangular or wing-shaped in plan so as to provide a sloping edge for initial contact with an oncoming log. Each shaft is connected by a suitable drive to a shorter shaft that is rotatably mounted in the apex or free end of each arm and said free ends being swingable away from the drum axis by the engagement of an oncoming log with said sloping edge. Each shorter shaft carries the bark removing tools and upon rotation of the drum these tools are rotated at a considerably higher speed of rotation than the speed of rotation of the drum.

Figure 5:
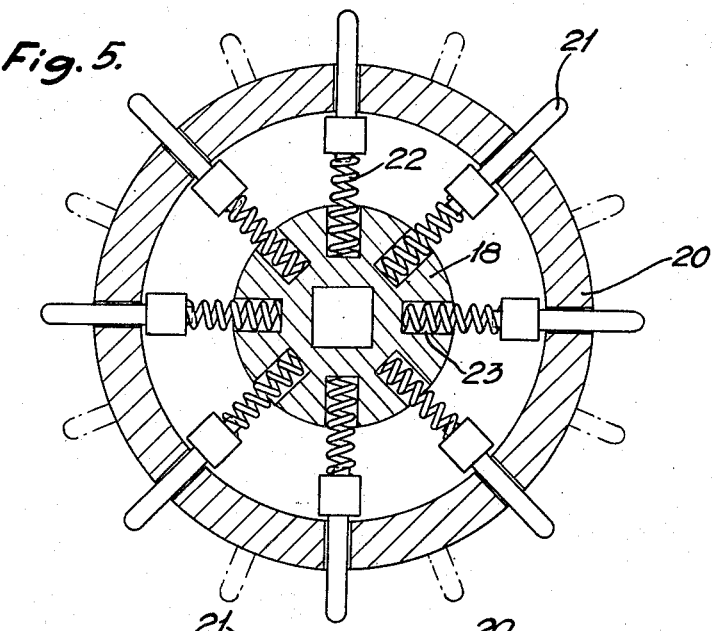
Figure 6:
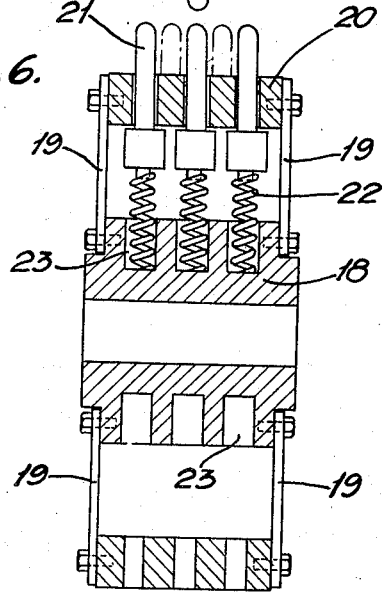

An embodiment of the invention is shown by way of example in the accompanying drawing, in which:

Fig. 1 is a side view and Fig. 2 is a top view of the machine. Fig. 3 is a front elevational view, partly in section of the preferred embodiment looking from the right in Fig. 1 and taken from a position immediately forward of the wing-shaped arms. Fig. 4 is a longitudinal view, partly in section and partly in elevation, taken along lines 4—4 of Fig. 3 with the log removed. Fig. 5 is a cross section of a pin-mill, and Fig. 6 is a longitudinal section of the same.

In the drawing, numeral 1 designates the frame of a machine carrying a fixed ring 2. Said ring serves as a bearing for a rotatable drum 3. At its inner periphery said drum carries three rotatably mounted shafts 4, each of which carries a right triangular or wing-shaped arm 5. The wing edge 6 facing the feed direction is chamfered. The wing is swingable against the action of a spring 7. In the end facing the centre of the drum the wing 5 carries a rotatably mounted shaft 8 on which the barking tools are fixed. The shaft 8 is connected with the shaft 4 by means of a chain transmission 9 and is caused to rotate by means of a pinion 10 on shaft 4 and which is in mesh with a fixed spur gear 11 located on the inside of the bearing or ring 2. Upon rotation of the drum the barking tools on the shaft 8 are caused to rotate at a considerably higher speed than the drum.

2

The barking tools consist of a cone 12, a knife cutter 13, a pin-mill 14 and a steel brush 15. All these tools, except the brush, are adjustable with regard to their diameter and thus the working depth.

The cone 12 has for its object to facilitate the uniform penetration of the tools into the bark and to prevent too deep or sudden incision of the tools into the log. By means of the cone it is obtained that the tools always will be located in the correct and most advantageous working position relatively to the log.

The knife cutter 13 can be designed in any known manner, the knives cutting the bark into suitable pieces, said pieces being then loosened by the subsequent mill.

The pin-mill 14 consists of a hub 18 keyed to the shaft 8, said hub being by means of two annular plates 19 fastened to a jacket 20 surrounding the hub. The mill drum thus formed carries a number of radially disposed pins 21 which are movably mounted in holes in the jacket 20 and adapted to be pressed into the same against the action of springs 22. For a part of their length, said springs are mounted in bores 23 in the hub 18. The pins are placed in rows which are displaced relatively to each other as indicated in the broken line positions of the pins in Figs. 5 and 6. Upon impact of the pins against the bark the latter is loosened from the underlying wood without said wood being damaged by the blunt pins. Due to the movability of the pins in the radial direction neither resin nor bark can stick to the tool. Consequently, the tool is completely self-cleaning. The springs 22 may also be omitted, the pressure action of the pins being entirely effected by centrifugal force. In this case provision is made for the necessary guiding of the pins.

The brush 15 located behind the pin-mill on the shaft 8 has for its object to scrape off remaining bark and to clean the surface of the barked log.

The machine also comprises two feed rollers 24, 24 and two discharge rollers 25, 25 which preferably are provided with conventional dowels, flutes or the like.

Each feed roller 24 is carried by arms 26 which are pivoted in the frame. The rollers may be arranged vertically and parallel with each other and, through the actuation of the log, be displaceable from each other against the action of a spring 27 connecting the arms of the rollers with each other.

The discharge rollers 25 may be arranged horizontally and mounted in the same manner by means of arms 28 and connected by means of a spring 29.

It is also possible to arrange the feed rollers horizontally and the discharge rollers vertically.

The logs are brought to the barking machine on a feed path, preferably made as a roller way with rollers 30 decreasing in width towards their middle. The rollers are mounted in a frame 31 which is arranged adjustable in the vertical direction. By this it is insured that the centre of the log always will coincide with the centre of the barking drum quite independently of the diameter of the log.

In the embodiment shown, the frame 31 is supported by stays 32 which are articulately connected with the frame and have their lower ends pivotally mounted in a frame 33. The stays are connected with the frame 33 by means of springs 34. The frame which is adapted to be let down, is by means of a pull member 35 connected with the setting arms of the feed rollers so that according to the diameter of the logs the roller way always comes in the correct position relatively to the feed rollers.

The discharge path at the opposite end of the machine is constructed in the same manner as the feed path, and connected with the arms of the discharge rollers by means of a pull member 36 so that the adjustment of said rollers and of the path will cooperate with each other. However, the rollers 37 on the discharge path may be completely cylindrical.

All movable members, such as the barking drum with the barking tools, the feed and discharge rollers and the feed and discharge paths, are driven from a motor 38 located on the frame of the machine. From the motor the rotary motion is transmitted to the drum preferably by means of cone ropes 39, and to the other drive members by means of chain transmissions and intermediate shafts, for example, as will be seen from Figs. 1 and 2.

The barking machine according to the invention operates fully automatically, and lumber of any diameter may be barked with the same good result. Although the barking tools are made to rotate at great speed, the drum need only rotate at small speed, which reduces the wear and gives the machine a smooth run. Due to the adjustability of the feed devices the logs, in spite of their different dimensions, will always enter the drum centrally, and the resilient construction of the wings insures that undesirable shocks and dangerous stresses are eliminated. The bark cutters will always operate in the most effective manner and, in contradistinction to what is the case in some earlier machines, the cutters will easily reach bark that remains on the log behind knots, branches, and the like.

The machine does not require any special service and is always ready for feeding. In sawmills and pulp industries the lumber may be fed into the machine directly from the hoisting device, and the peeled-off bark is disintegrated in such a manner in the machine that it can be fed directly into conduits leading to boilers or other furnace devices. The machine may also with advantage be used in lumber depots in the forest, at the roadside or at float ways.

The bark cutters may be easily inspected and exchanged, and the whole machine may easily be made transportable on cars or boats.

The machine according to the invention should not be considered as restricted to the embodiment described and disclosed. Particularly as regards the details, it may be varied in many different ways within the scope of the claimed invention.

Having now described our invention, what we claim as new and desire to secure by Letters Patent is:

1. A debarking machine including a frame, an annular bearing fixedly supported by said frame, a drum rotatably mounted within said bearing, means for rotating said drum, a plurality of shafts rotatably mounted on the inner periphery of said drum in circumferentially substantially equi-spaced relationship with their axes parallel with the drum axis, an internal spur gear provided on said bearing, a pinion on each shaft in mesh with said gear, an arm swingably mounted at one end on each shaft, resilient means urging the arm toward the drum axis, additional and shorter shafts respectively journalled in the free ends of each arm with their axes parallel with the drum axis, at least one debarking tool carried by each additional shaft and means transmitting rotation between the respective first mentioned and additional shafts associated with each arm, and said arms being wing shaped in plan and including a log contacting edge extending obliquely from a point adjacent the drum axis toward the periphery of the drum and toward an oncoming log whereby a fed log abuts said edges of the arms to swing the same away from the drum axis to automatically position the tool in proper operating relationship regardless of the diameter of the fed log.

2. A debarking machine including a frame, an annular bearing fixedly supported by said frame, a drum rotatably mounted within said bearing and through which drum logs to be debarked pass, a plurality of debarking tool supporting arms yieldingly swingably mounted at one end on the inner periphery of said drum for swinging movement about axes parallel with the drum axis, rotary debarking tools carried by the free ends of each arm; drive means for rotating said tools including inter-meshing pinions and a spur gear provided respectively on the arms and on said bearing, and means transmitting rotation of said pinions to said tools; and each of said arms being wing shaped in plan and including a log contacting edge extending obliquely from a point adjacent the drum axis toward the drum periphery and toward an oncoming log, whereby a fed log will abut said edges and swing the arms outward of the drum axis to automatically position said tools in proper operating relationship regardless of the diameter of the fed log.

3. A machine as defined in and by claim 2 wherein each said edge is chamfered.

OLOF R. KOLPE.
OSCAR B. ANDERSSON.

References Cited in the file of this patent

UNITED STATES PATENTS

| Number | Name | Date |
| --- | --- | --- |
| 867,893 | Metcalf | Oct. 8, 1907 |
| 987,828 | Schenck | Mar. 28, 1911 |
| 1,440,042 | Whalley | Dec. 26, 1922 |
| 1,887,853 | Jinnet | Nov. 15, 1932 |

FOREIGN PATENTS

| Number | Country | Date |
| --- | --- | --- |
| 191,619 | Germany | 1907 |
| 41,554 | Sweden | 1916 |
| 54,826 | Denmark | June 7, 1938 |